(12) United States Patent
Rider et al.

(10) Patent No.: US 7,743,231 B2
(45) Date of Patent: Jun. 22, 2010

(54) FAST SPARSE LIST WALKER (75) Inventors: Scot H. Rider, Pleasant Valley, NY (US); Todd A. Strader, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 470 days.

(21) Appl. No.: 11/679,282

(22) Filed: Feb. 27, 2007

(65) Prior Publication Data

US 2008/0209183 A1    Aug. 28, 2008

(51) Int. Cl.
*G06F 15/00* (2006.01)

(52) U.S. Cl. .............................. 712/6; 712/4; 712/225; 712/300

(58) Field of Classification Search ................ 712/2, 712/4–6, 224–225, 300
See application file for complete search history.

(56) References Cited

U.S. PATENT DOCUMENTS

| | | | |
|---|---|---|---|
| 4,881,168 A * | 11/1989 | Inagami et al. ................. | 712/5 |
| 5,532,693 A | 7/1996 | Winters et al. | |
| 5,649,181 A * | 7/1997 | French et al. ................. | 707/3 |
| 5,727,200 A * | 3/1998 | Narita et al. ................. | 707/7 |
| 5,742,797 A | 4/1998 | Celi, Jr. et al. | |
| 5,852,821 A * | 12/1998 | Chen et al. ................. | 707/2 |
| 6,249,884 B1 | 6/2001 | Joo | |
| 6,269,363 B1 * | 7/2001 | Matias ......................... | 707/5 |
| 6,314,436 B1 | 11/2001 | Houldsworth | |
| 6,483,742 B1 * | 11/2002 | Sweha et al. ........... | 365/185.03 |
| 6,678,807 B2 * | 1/2004 | Boatright et al. ............. | 711/154 |
| 6,681,224 B2 | 1/2004 | Namba | |
| 7,451,143 B2 * | 11/2008 | Sharangpani et al. .......... | 707/6 |
| 7,464,254 B2 * | 12/2008 | Sharangpani et al. ....... | 712/300 |
| 2002/0120813 A1 * | 8/2002 | Boatright et al. ............. | 711/118 |
| 2004/0019753 A1 * | 1/2004 | Boatright et al. ............. | 711/154 |
| 2004/0059725 A1 * | 3/2004 | Sharangpani et al. .......... | 707/3 |
| 2004/0215593 A1 * | 10/2004 | Sharangpani et al. .......... | 707/1 |

FOREIGN PATENT DOCUMENTS

JP    2001-222537 A    2/2000

* cited by examiner

*Primary Examiner*—Aimee J Li
(74) *Attorney, Agent, or Firm*—Jon A. Gibbons; Fleit Gibbons Gutman Bongini & Bianco P.L.

(57) ABSTRACT

Provided are a method, information processing system, and computer readable medium for identifying active bits in a vector. The method comprises receiving a pointer associated with a vector of bits. The pointer is associated with a current bit within the vector of bits. The vector of bits if grouped into groups of a mathematical power of two, which is any non-negative integer powers of two. One or more current groups are determined which are the groups of the mathematical power of two comprising the current bit. The one or more current groups of the power of two are analyzed. A largest group of the power of two is identified in the one or more current groups comprising all empty bits. The pointer is set to point to a bit following a last bit in the identified largest group of the power of two comprising all empty bits.

20 Claims, 9 Drawing Sheets

| Bits | 0 | 1 | 2 | 3 | 4 | 5 | 6 | 7 | Ptr |
|---|---|---|---|---|---|---|---|---|---|
| 502 — T1 Vector | 0 | 0 | 0 | 0 | 0 | 0 | 1 | 0 | 0 |
| 504 — T2 Vector | 0 | 0 | 0 | 0 | 0 | 0 | 1 | 0 | 4 |
| 506 — T3 Vector | 0 | 1 | 0 | 0 | 0 | 0 | 1 | 0 | 6 |
| 508 — T4 Vector | 0 | 1 | 0 | 0 | 0 | 0 | 0 | 0 | 7 |
| 510 — T5 Vector | 0 | 1 | 0 | 0 | 0 | 0 | 0 | 0 | 0 |

FSLW

| Bits | | 0 | 1 | 2 | 3 | 4 | 5 | 6 | 7 | Ptr |
|---|---|---|---|---|---|---|---|---|---|---|
| 702 — T1 | Vector | 0 | 1 | 0 | 0 | 0 | 1 | 0 | 0 | 0 |
| | Mask | 0 | 1 | 0 | 0 | 0 | 1 | 0 | 0 | |
| 704 — T2 | Vector | 0 | 1 | 0 | 0 | 0 | 1 | 0 | 0 | 1 |
| | Mask | 0 | 0 | 0 | 0 | 0 | 1 | 0 | 0 | |
| 706 — T3 | Vector | 0 | 0 | 0 | 0 | 0 | 1 | 0 | 0 | 4 |
| | Mask | 0 | 0 | 0 | 0 | 0 | 1 | 0 | 0 | |
| 708 — T4 | Vector | 0 | 0 | 0 | 0 | 1 | 1 | 0 | 0 | 5 |
| | Mask | 0 | 0 | 0 | 0 | 1 | 0 | 0 | 0 | |
| 710 — T5 | Vector | 0 | 0 | 0 | 0 | 1 | 1 | 0 | 0 | 6 |
| | Mask | 0 | 0 | 0 | 0 | 1 | 1 | 0 | 0 | |

FSLW

| | | | | FSLW w Mask B | | | | | Ptr |
|---|---|---|---|---|---|---|---|---|---|
| | 0 | 1 | 2 | 3 | 4 | 5 | 6 | 7 | |
| 908 — T4 Vector Mask | 0 0 | 0 0 | 0 0 | 0 0 | 1 0 | 1 0 | 0 0 | 0 0 | 5 |
| 910 — T5 Vector Mask | 0 0 | 0 0 | 0 0 | 0 0 | 1 1 | 0 0 | 0 0 | 0 0 | 0 |
| 912 — T6 Vector Mask | 0 0 | 0 0 | 0 0 | 0 0 | 1 0 | 0 0 | 0 0 | 0 0 | 4 |

Green = Improved over Mask A and no mask
Yellow = Improved over no mask

FAST SPARSE LIST WALKER

FIELD OF THE INVENTION

The present invention generally relates to the field of information electronic devices, and more particularly relates to identifying active bits in a vector.

BACKGROUND OF THE INVENTION

In a system where a set of actions needs to be enacted based on a vector of a plurality of bits and only one of the actions can be performed at a time, the problem exists of walking the vector to determine which actions should be taken while maintaining fairness. One solution is to increment through the bits of the vector and check if each bit is on or off. This is a simple solution, but has a worst-case time to find an active bit in the list of $2^n$ where $2^n$ is the length of the list. Another solution is to use a priority decoder to find active bits in the vector. This solution identifies an active bit every cycle if one exists, but requires many resources and is unfair. Also, bits that are low in the priority tree can be blocked. Yet another solution is to implement a round-robin arbiter, but this solution becomes too large to implement as the vector grows.

Therefore a need exists to overcome the problems with the prior art as discussed above.

SUMMARY OF THE INVENTION

Briefly, in accordance with the present invention, disclosed are a method, information processing system, and a computer readable medium for identifying active bits in a vector. The method comprises receiving a pointer associated with a vector of bits. The pointer is associated with a current bit within the vector of bits. The vector of bits if grouped into groups of a mathematical power of two, which is any non-negative integer powers of two. One or more current groups are determined which are the groups of the mathematical power of two comprising the current bit. The one or more current groups of the power of two are analyzed in response to receiving the pointer. A largest group of the power of two is identified in the one or more current groups comprising all empty bits in response to the analyzing. The pointer is set to point to a bit following a last bit in the identified largest group of the power of two comprising all empty bits.

In yet another embodiment an information processing system for identifying active bits in a vector is disclosed. The information processing system includes a memory and a processor that is communicatively coupled to the memory. The information processing system also includes a circuit that is communicatively coupled to the memory and the processor. The circuit is adapted to receiving a pointer associated with a vector of bits. The pointer is associated with a current bit within the vector of bits. The vector of bits if grouped into groups of a mathematical power of two, which is any non-negative integer powers of two. One or more current groups are determined which are the groups of the mathematical power of two comprising the current bit. The one or more current groups of the power of two are analyzed in response to receiving the pointer. A largest group of the power of two is identified in the one or more current groups comprising all empty bits in response to the analyzing. The pointer is set to point to a bit following a last bit in the identified largest group of the power of two comprising all empty bits.

In yet another embodiment, a computer readable medium for identifying active bits in a vector is disclosed. The computer readable medium includes instructions for receiving a pointer associated with a vector of bits. The pointer is associated with a current bit within the vector of bits. The vector of bits if grouped into groups of a mathematical power of two, which is any non-negative integer powers of two. One or more current groups are determined which are the groups of the mathematical power of two comprising the current bit. The one or more current groups of the power of two are analyzed in response to receiving the pointer. A largest group of the power of two is identified in the one or more current groups comprising all empty bits in response to the analyzing. The pointer is set to point to a bit following a last bit in the identified largest group of the power of two comprising all empty bits.

One advantage of the present invention is that the time to find active bits in a vector is significantly reduced. For example, a vector can be continually subdivided in half and each resulting portion can analyzed to determine if any of the bits are active. In other words, the present invention allows a pointer into the vector to be moved past a region as large as possible such as a region with a size $2^{n-1}$ of the vector in a binary search style method. The present invention greatly reduces the search time while being able to implement with fewer resources as compared to the methods discussed above. Another advantage of the present invention is that it provides a fair searching method. In other words, bits already searched over are not searched over again until the Fast Sparse List Walker ("FSLW") wraps around.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one as or more than one. The term plurality, as used herein, is defined as two as or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Fast Sparse List Walker

Figure 1:
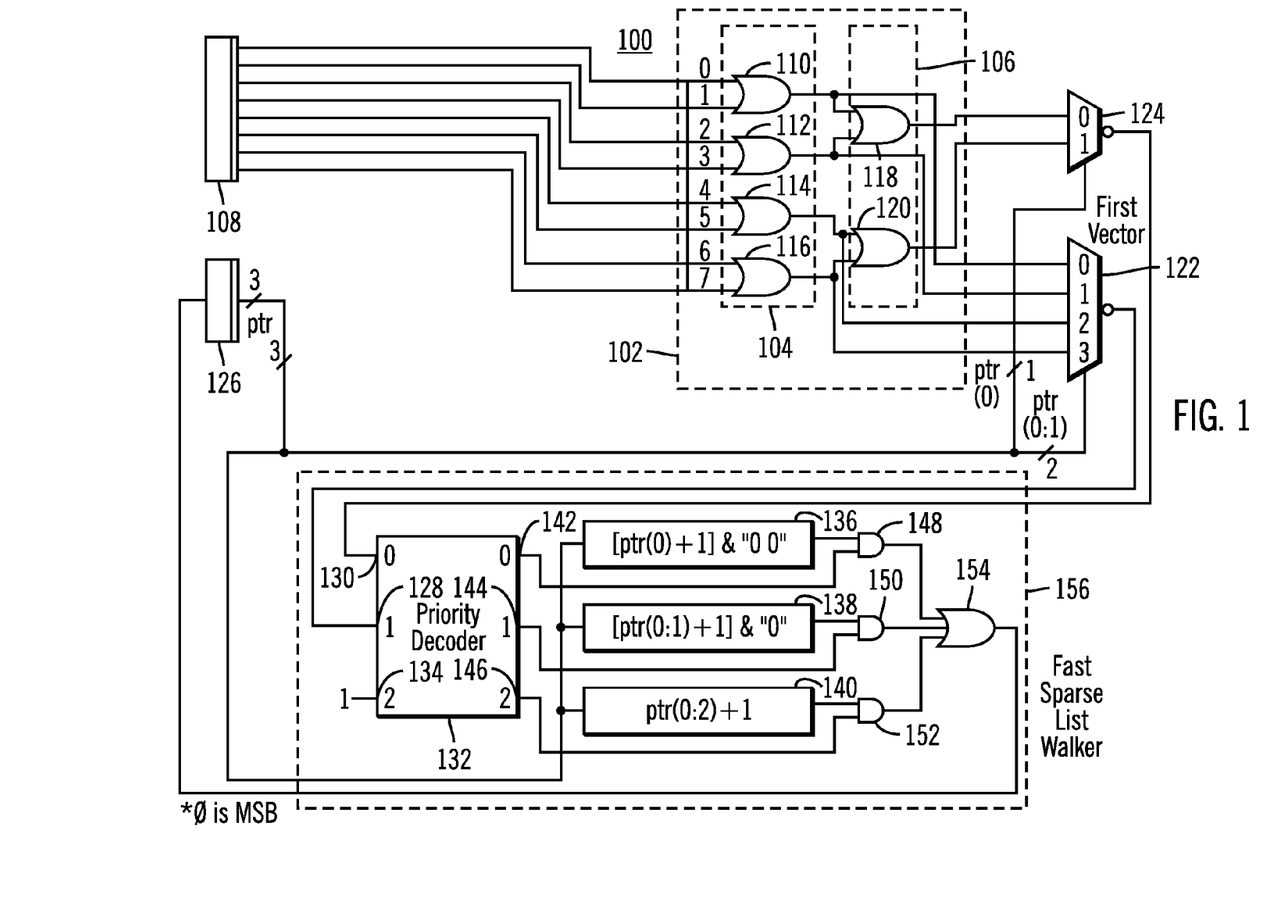
FIG. 1 is a schematic of a fast sparse list walker ("FSLW") circuit according to an embodiment of the present invention.

FIG. 1 shows a schematic of a fast sparse list walker ("FSLW") circuit 100. In one embodiment, the FSLW circuit 100 resides within a networking device. However, this is only one example and is not limiting. The FSLW circuit 100 identifies active bits in a vector by continually subdividing the vector into groups of powers of two. For example, the FSLW circuit 100, in one embodiment, uses a current pointer position and set of binary halving circuits to find the next active bit. This reduces the complexity of the circuitry to an order of N as compared to $N^2$ and finds the next active bit in a vector in an order of Log 2(N) time. This is compared to an order of N as found with a linear search.

In one embodiment, the FSLW circuit 100 determines the largest power of two group that it can skip, i.e., the largest group without any active bits. One advantage of the present invention is that active bits in a vector can be identified in a quick and efficient manner. It should be noted that the following discussing uses the FSLW circuit 100 within the context of determining a network endpoint or node that requires and acknowledgment. However, this is only one example that is applicable to the present invention and is not limiting. A vector, in one embodiment, can be a one dimensional array.

Figure 2:
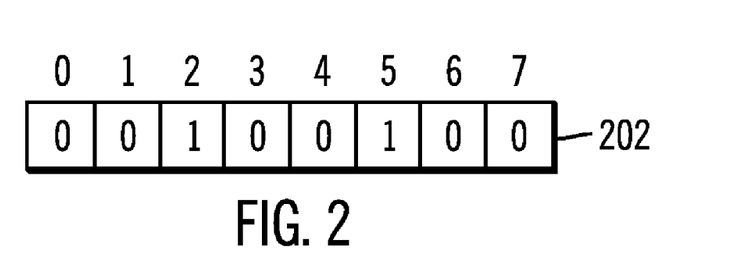
FIG. 2 is a block diagram illustrating one example of an 8-bit vector according to an embodiment of the present invention.

FIG. 1 shows a set of binary halving circuits 102 comprising a first level 104 of OR gates and a second level 106 of OR gates. One or more sources 108 are coupled to the first level 104 of OR gates. For example, FIG. 1 shows a source 108 providing an 8 bit input into the first level 104 OR gates, wherein each of the four OR gates, 110, 112, 114, 116 receives a two bit input. The FSLW circuit 100 can receive data from the one or more sources 108 at the same time. It should be noted that the 8 bit input form the source 108 is referred to through this discussion as an 8-bit vector. An example of an 8-bit vector is shown in FIG. 2. FIG. 2 shows an 8-bit vector 202 wherein bit 2 and bit 5 are active. In one example, the FSLW circuit 100 identifies the active bits which indicate that an end point associated with the active bits require an acknowledgement to be sent to them.

Figure 3:
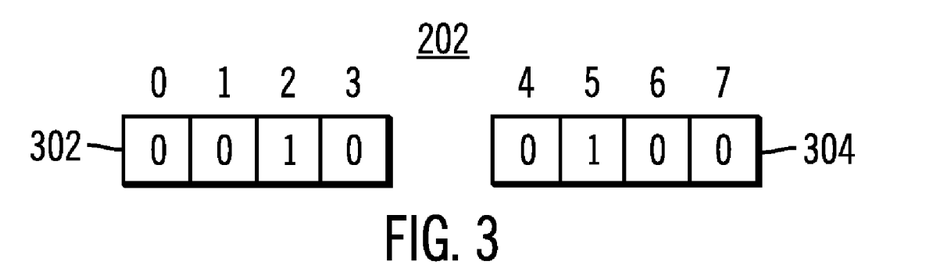
FIG. 3 is a block diagram showing the 8-bit vector of FIG. 2 after being divided in half by the FSLW of FIG. 1 according to one embodiment of the present invention.
Figure 4:
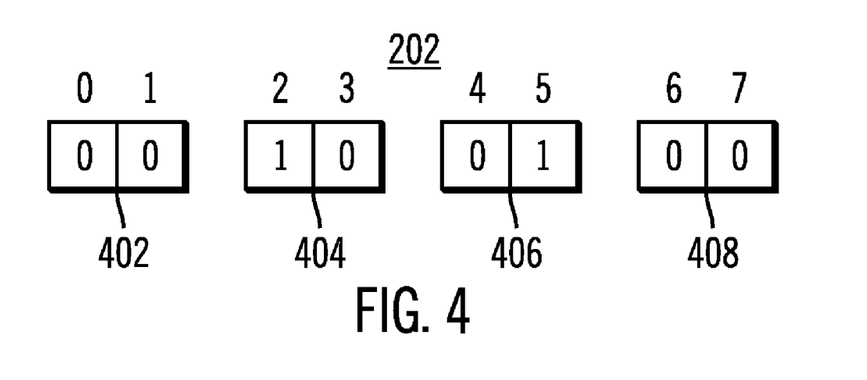
FIG. 4 is a block diagram showing each half of the 8-bit vector in FIG. 3 after they are further divided by the FSLW of FIG. 1 according to one embodiment of the present invention.

Each OR gate 110, 112, 114, 116 in the first level 104 takes each of its inputs and OR's them together. A first OR gate 118 in the second level 106 of OR gates takes as input the output from the first OR gate 110 and the output of the second OR gate 112. A second OR gate 120 in the second level 106 takes as input the output from the third OR gate 114 and the output of the fourth OR gate 116. The OR gates 118, 120 in the second level 106 take their inputs and OR's them together. Each level 104, 106 of OR gates halves the vector. In other words, the second level 106 of OR gates creates two halves from the 8-bit vector, a first half comprising bits 0 to 3 and a second half comprising bits 4 to 7. For example, FIG. 3 shows the 8-bit vector 202 after it has been halved by the second level 106 of OR gates resulting in a first half 302 and a second half 304. The first level 104 of OR gates further halves each of the halves For example, FIG. 4 shows the 8-bit vector 202 after the first and second halves 302, 304 have been halved again resulting in a first quarter 402, a second quarter 404, a third quarter 406, and a fourth quarter 408.

As each half, quarter, etc., of the vector is created by the binary halving circuit 102, the half is analyzed by the FSLW 100 to determine if any active bits exist in the current power of 2 group, the power of 2 group being the current half, quarter, etc of the vector. Therefore, two multiplexers ("MUX") 122, 124 are provided in the FSLW circuit 100. The first MUX 122 receives the output from the four OR gates 110, 112, 114, 116 in the first level 104 of OR gates. The second MUX 124 receives the output from each of the OR gates 118, 120 in the second level 106. A pointer source 126 provides a 3-bit pointer to each of the multiplexers 122, 124 to be used as a selector. The pointer indicates the current position being searched within the vector 202. Using the MSBs (most significant bits) of the pointer, each level 104, 106 of OR gates is multiplexed and the correct sections of the OR tree is selected.

For example, if a first half 302 of the vector 202 does not include any active bits, the FSLW circuit 100 can skip directly to bit 4 in the second half 304. However, if the first half 302 does include one or more active bits, the FSLW circuit 100 analyzes the current quarter either 402 or 404 of the first half 302 to identify the active bit. The pointer provides a fair searching method that prevents one bit from being serviced more than other. In other words, if a bit within a vector has already been visited, the bit is not visited again until all the remaining bits are visited or skipped. For example, if the FSLW circuit 100 determines that bits 0 to 3 are not active, the FSLW skips directly to bit 4. However, assume bit 2 becomes active after the FSLW circuit 100 has skipped to bit 4. The FSLW circuit 100 uses the pointer to determine that it has already visited bit 2 and the FSLW does not return to bit 2 until after bits 4 through 7 have been visited or skipped.

Figure 5:
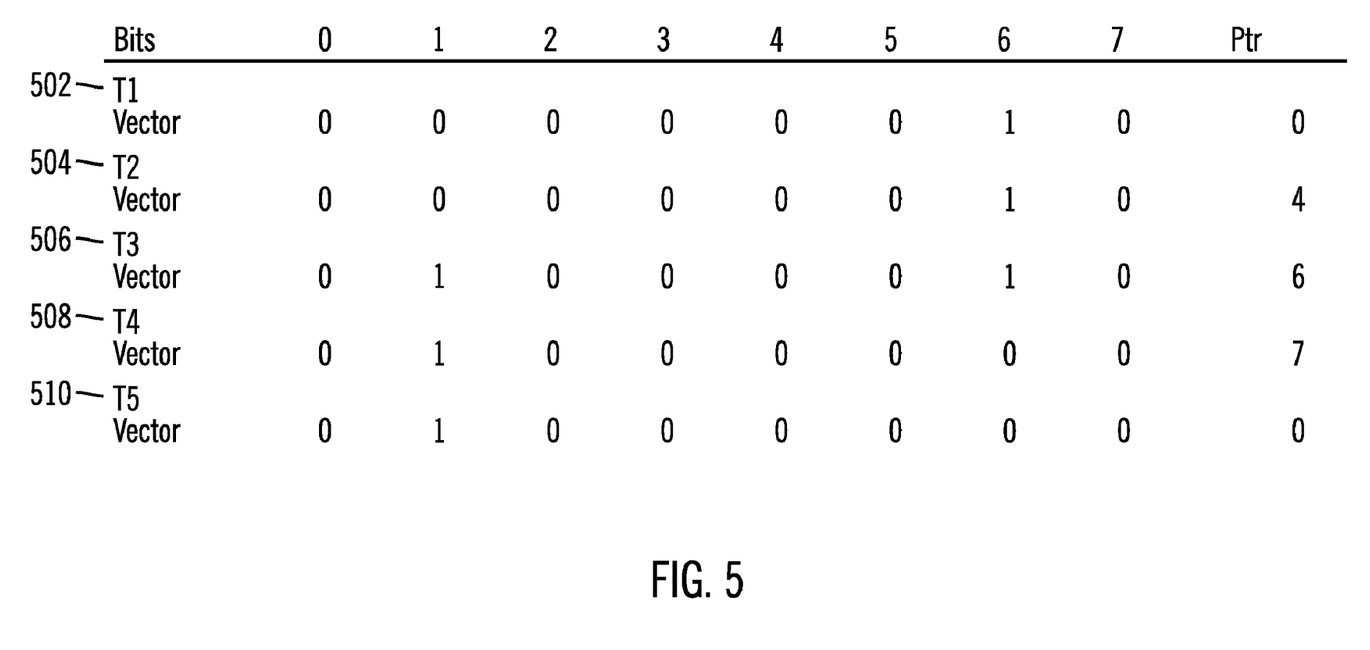
FIG. 5 is timing diagram for the FSLW of FIG. 1 according to an embodiment of the present invention.

FIG. 5 shows an example of the fairness aspect halving method as discussed above. At time cycle 1 502, the pointer is at bit 0. The halving circuit 102 of the FSLW circuit 100 halves the vector into two groups comprising bits 0 to 3 and 4 to 7, respectively. Because the pointer is currently at bit 0, the FSLW circuit 100 analyzes the first half comprising bits 0 to 3. The FSLW circuit 100 determines that there are no active bits in the first half and therefore updates the point to point to bit 4. Therefore, at time cycle 2 504, the pointer is now at bit 4 and the FSLW circuit 100 begins analyzing the second half of the vector. As can be seen, this significantly reduces the search time because the FSLW circuit 100 does not have to analyze each bit, instead the FSLW 100 circuit looks at groups of bit in powers of 2. Stated differently, without the present invention, the FSLW circuit 100 would look at bit 0, bit 1, bit 2, and bit 3, which makes the pointer point to bit 4 at time cycle 5, as compared to time cycle 2, as discussed above.

At time cycle 2 504, the FSLW circuit 100 analyzes the second half of the vector and determines that it includes an active bit. Therefore, the FSLW circuit 100 looks at the current quarter of the second half which is bits 4 to 5 and determines that the current quarter does not have any active bits. Therefore, at time cycle 3 506, the pointer points to bit 6, wherein the FSLW circuit 100 analyzes the second half of the vector and determines that it includes an active bit and then analyzes the second quarter including bits 6 and 7. Bit 6 is active. In the networking example, the active bit indicates that the end point associated with the bit requires an acknowledgment sent to it. FIG. 5 also shows that at time cycle 3 506, bit 1 have become active. However, the FSLW circuit 100 provides a fair searching method so bit 1 is not re-visited until all remaining bits have been visited. Because bits 6 and 7 contained an active bit, the FSLW circuit 100 sets the pointer to bit 7 at time cycle 4 508. The FSLW determines that bits 4 through 7 contain no active bits so the FSLW circuit 100 sets the pointer to bit 0 at time cycle 5 510. As can be seen, the search time for identifying active bits is significantly reduced over prior methods and the pointer provides a fair searching method.

Returning back to FIG. 1, the output of each MUX 122, 124 is used to increment the pointer. The output of the first multiplexer 122 is received at a second input port 128 of a priority decoder 132. The output of the second multiplexer 124 is inverted and received at a first input port 130 of the priority decoder 132. A third input port 134 of the priority decoder is set to 1. Three adders 136, 138, 140 are also used to increment the pointer to point to the correct bit. The first adder 136 increments the first MSB of the pointer and zeros out the remaining bits. The second adder 138 increments the first two MSBs of the pointer and zeros out the remaining bit. The third adder 140 increments the entire pointer. The first output 142 of the priority decoder 132 and the output of the first adder 136 are received as inputs at a first AND gate 148. The second output 144 of the priority decoder 132 and the output of the second adder 138 are received as inputs at a second AND gate 150. The third output 146 of the priority decoder 132 and the output of the third adder 140 are received as inputs at a third AND gate 152. These inputs are AND'ed together and the resulting output of each AND gate 148, 150, 152 is received as an input at a three input OR gate 154. These inputs are OR'ed together and the resulting output is received as an input at the pointer source 126. The output of the three input OR gate 154 is the next pointer used by the FSLW circuit 100. For example, in FIG. 5 the pointer at time cycle 2 504 points to bit 4. After receiving the relevant inputs, the pointer incrementing circuit 156 of the FSLW circuit 100 increments the pointer to point to bit 6 at time cycle 3 506.

The worst case time to find an active bit in a non-empty vector is 2(n−1) where the list is $2^n$ long. In another embodiment of the present invention, the present invention decreases this worst case time by removing the current position in the vector that the pointer is at. This brings the worst case time down to 2(n−1)−1. However, the actual time is likely better because unless the vector is empty the FSLW circuit 100 always stops on an active bit in the vector. When the FSLW circuit 100 stops on an active bit, the pointer can only be increment by 1 on the next cycle unless this bit is masked off.

Figure 6:
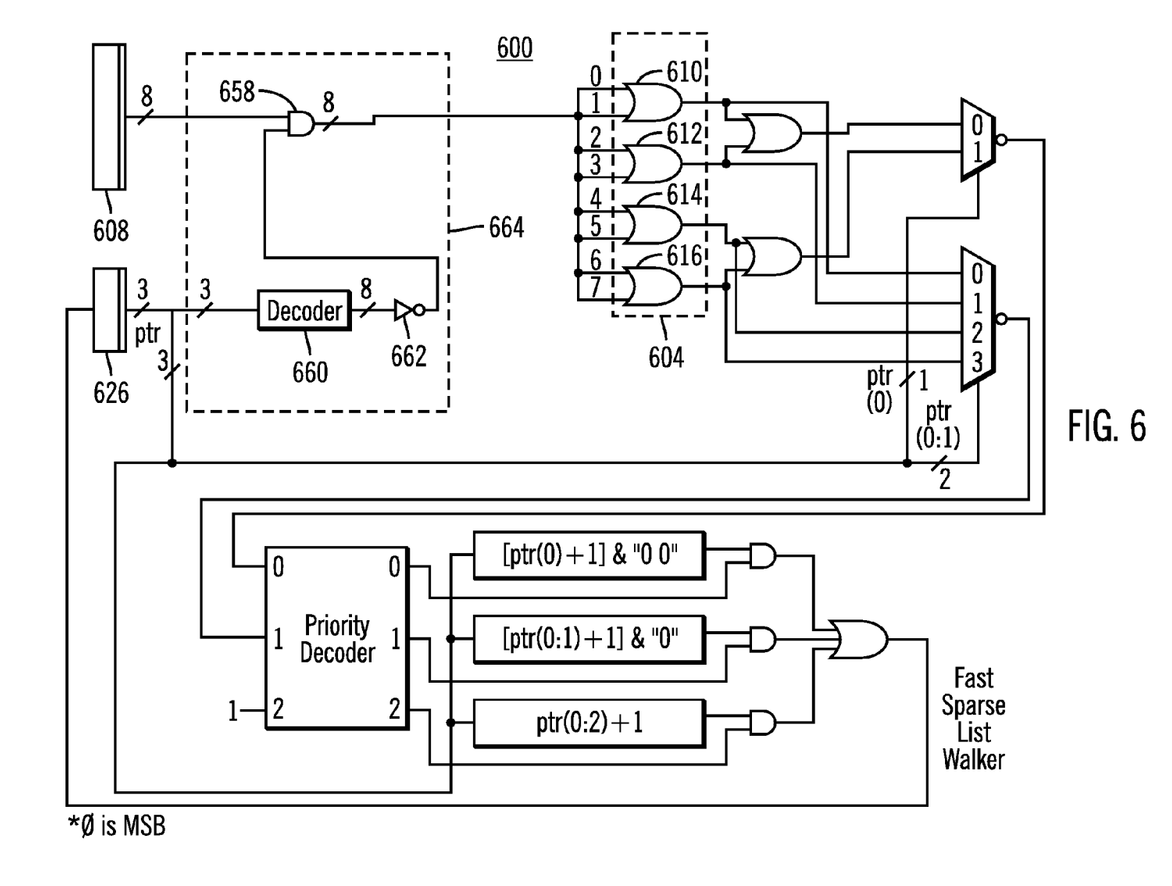
FIG. 6 is a schematic of another fast sparse list walker ("FSLW") circuit according to an embodiment of the present invention.
Figure 7:
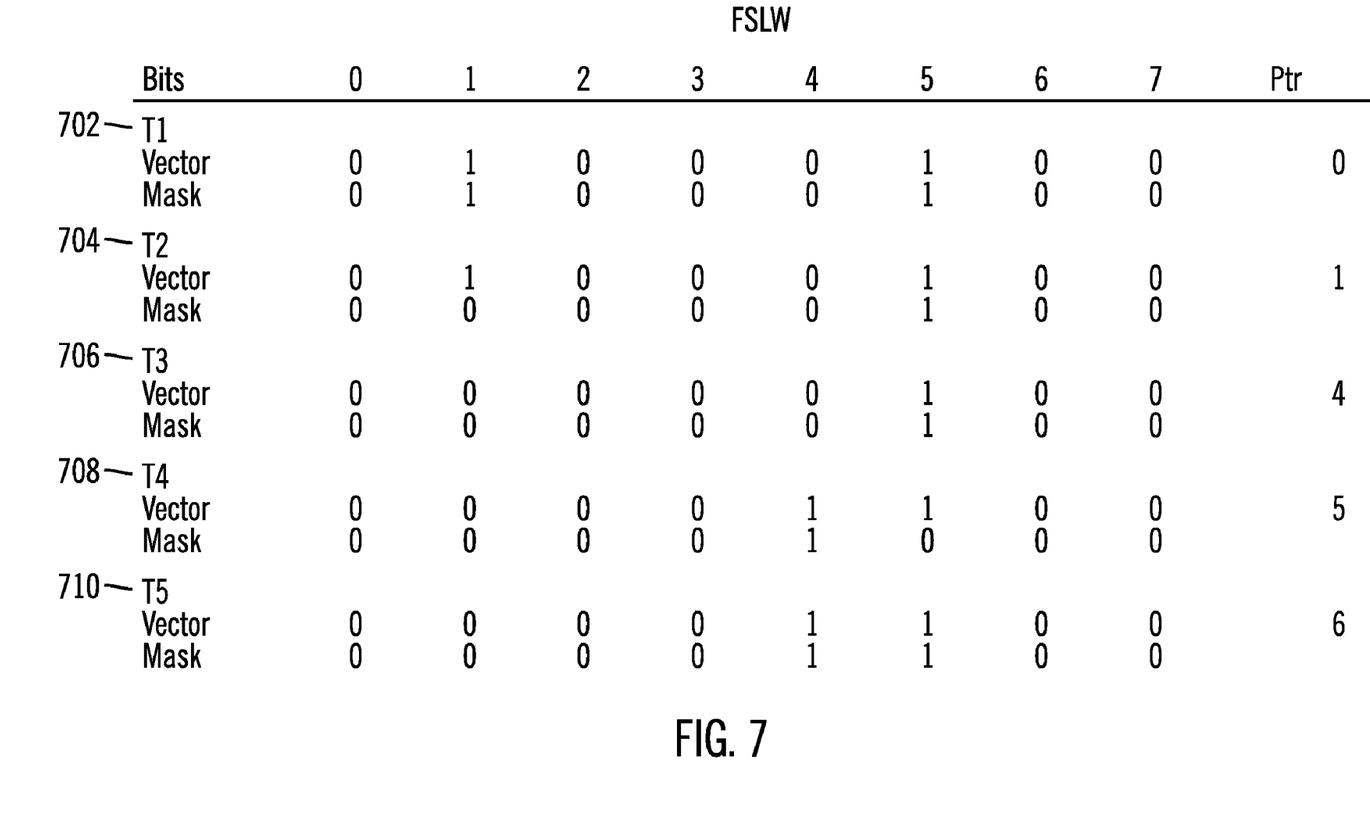
FIG. 7 is timing diagram for the FSLW of FIG. 6 according to an embodiment of the present invention.

FIG. 6 shows a schematic of an FSLW circuit 600 according to another embodiment of the present invention. The FSLW circuit 600 of FIG. 6 decreases the worst case time of 2(n−1) by removing the current position in the vector that the pointer is at. For example, FIG. 7 shows an example of masking off the current pointer position for providing a faster searching method. At time cycle 1 702, the pointer is pointing to bit 0. The FSLW circuit 600 determines that the first half of the vector comprising bits 0 to 3 includes at least one active bit. Therefore, the FSLW circuit 600 looks at the first quarter of the first half comprising bits 0 and 1. The FSLW circuit 600 increments the pointer to point to bit 1. bit 1 is active. In the networking example, an acknowledgment is sent to the end point associated with bit 1. At the next time cycle, cycle 3 706 The FSLW circuit 600 masks off bit 1 so that the pointer is incremented to point to bit 4. As can be seen, this provides a faster searching method than the method discussed above with respect to the FSLW circuit 100 and FIG. 5. In the same example as FIG. 7, the FSLW circuit 100 would increment the pointer at time cycle 3 706 to point to bit 2. However, because the FSLW circuit 600 masks off the current pointer position, the pointer can be incremented to the beginning of the next half, bit 4 in this example.

At time cycle 3 706, the FSLW circuit 600 determines that the second half of the vector includes at least one active bit and therefore looks at the first quarter of the second half. The FSLW circuit 600 determines that the first quarter of the second half contains an active bit and increments the pointer to point to bit 5 at time cycle 4 708. At time cycle 4 708 the FSLW circuit 600 applies a mask to bit 5. the FSLW circuit 600 determines that the second half contains an active bit and that the first quarter of the second half contains an active bit and increments the pointer to pointer to bit 6 at time cycle 5 710. FIG. 7 also shows that bit 4 has become active. However, because FSLW circuit 600 provides a fair searching method bit 4 is not revisited until all remaining bits are visited or skipped. At time cycle 5 710 the FSLW circuit 600 looks at the second half and determines that there is an active bit and the looks at the second quarter of the second half and determines that no active bits exist.

Returning to FIG. 6, the schematic for the FSLW circuit 600 is the same as that discussed for the FSLW circuit 100 of FIG. 1 with the exception of the masking circuit 664. The 8-bit input provided form the data source 608 is received as an input at an AND gate 658. The pointer data from the pointer source 626 is received as an input at a decoder 660. The output of the decoder 660 is inverted by a NOT gate 662 whose output is received as an input at the AND gate 658. The each bit of the 8 bit output of the AND gate 658 is received as an input for the four OR gates 610, 612, 614, 616 in the first level 604 of OR gates. The masking circuit 664 masks the current position of a pointer when an active bit is identified, as discussed above with respect to FIG. 7.

Figure 8:
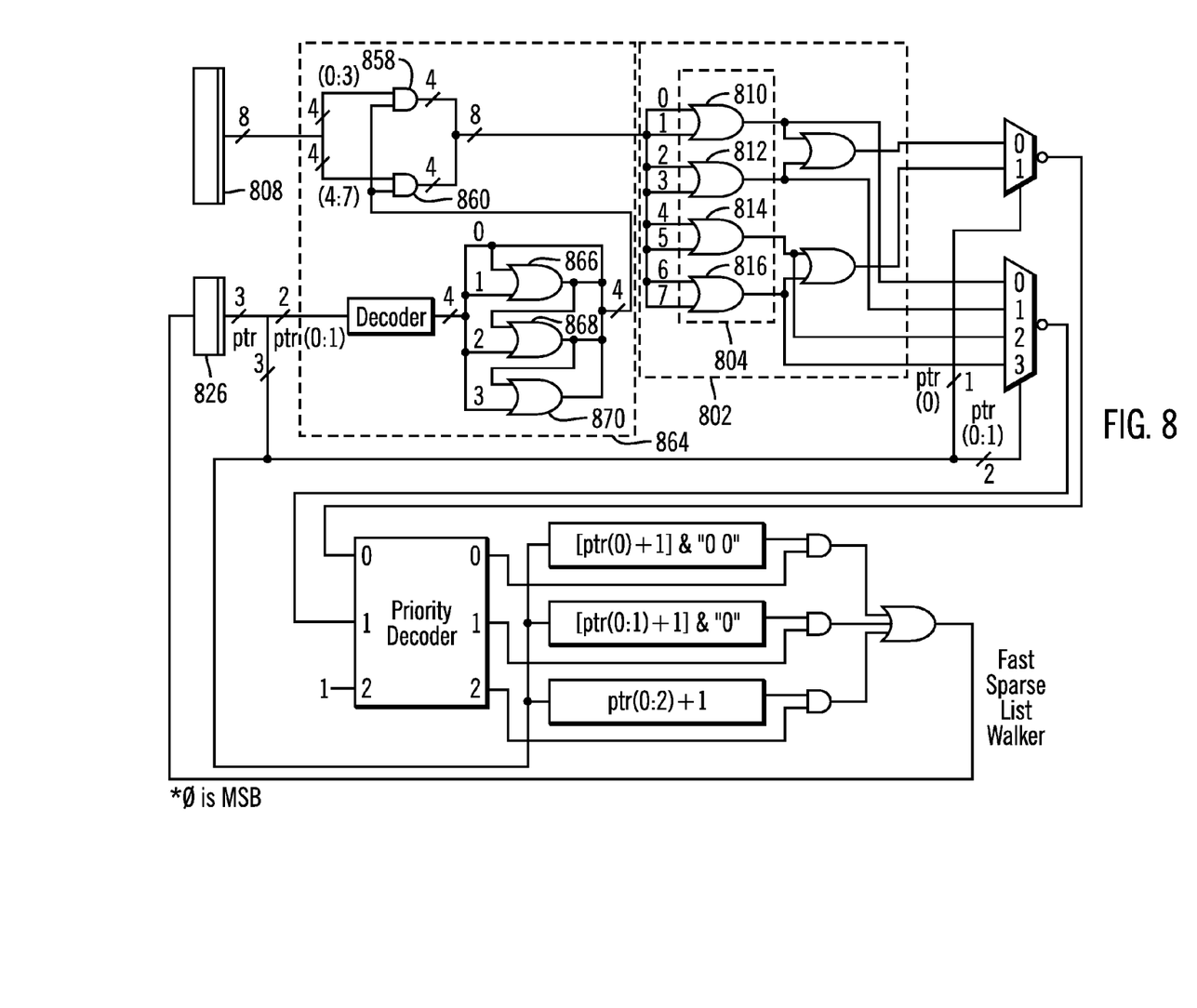
FIG. 8 is a schematic of another fast sparse list walker ("FSLW") circuit according to an embodiment of the present invention.
Figure 9:
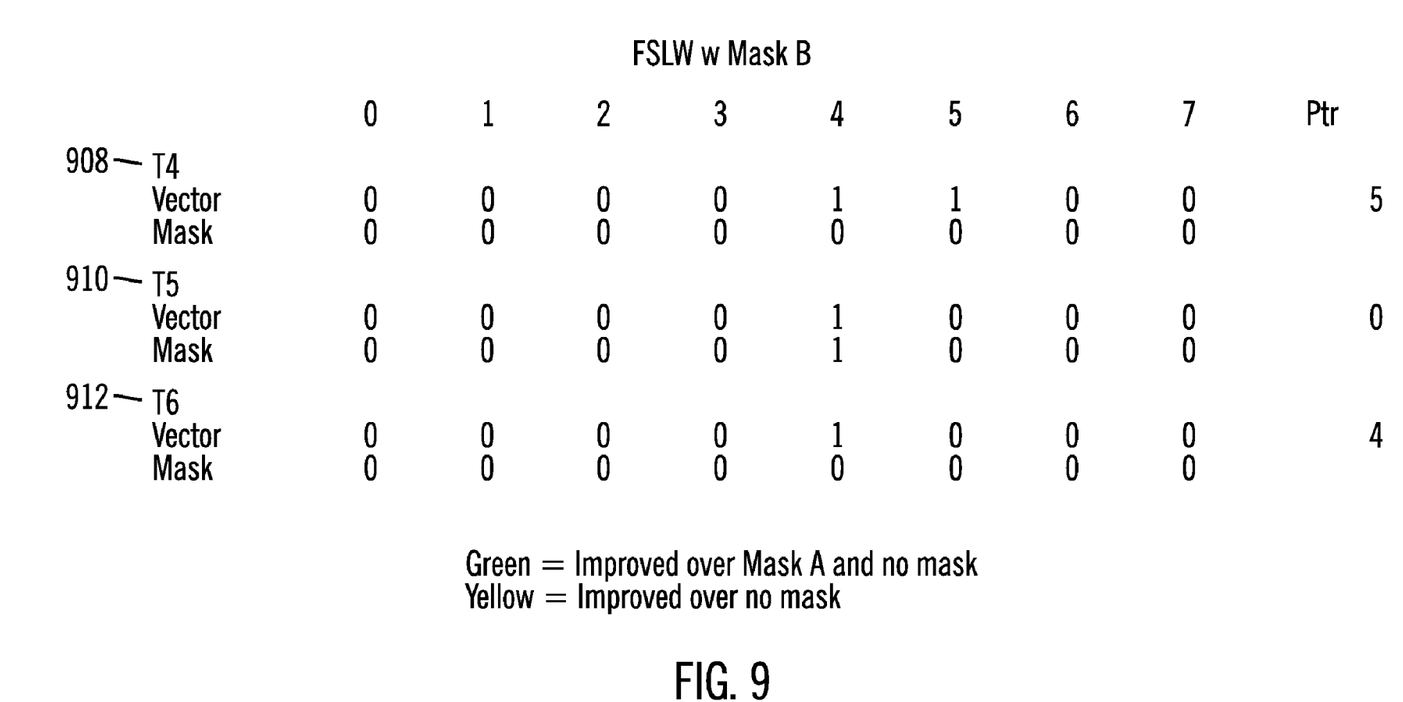
FIG. 9 is timing diagram for the FSLW of FIG. 8 according to an embodiment of the present invention.

In yet another embodiment, another FSLW circuit 800 is provided that further decreases the searching time for identifying active bits in a vector. The FSLW circuit 800 of FIG. 8 masks off all bits before and including the current pointer position in the current half of the vector. The same mask is applied to the other half of the vector, but since the largest grouping that is examined is half of the vector, the non-current half is a "do not care" half. This reduces the searching time down to N because the entire half of the vector that the pointer is currently in can be skipped regardless of what is in the vector before the pointer if the rest are not active. For example, FIG. 9 shows an example of searching for active bits using the FSLW circuit 800 of FIG. 8. The time cycles of FIG. 9 correspond to the time cycles in FIG. 7. For example time cycle 4 908 of FIG. 9 corresponds to time cycle 4 708 of FIG. 7.

At time cycle 4 908 the pointer is pointing to bit 5. The FSLW circuit 800 determines that bit 5 is an active bit and applies a mask to the current pointer position of bit 5 and the previous bits in the current half. Therefore, the FSLW circuit 800 sets the pointer to point to bit 0 at time cycle 5 910 as compared to bit 6 as shown in FIG. 7. The FSLW circuit 800 at time cycle 5 910 masks bit 0 and determines that no active bits exist in the first half. Therefore, the FSLW circuit 800 sets the pointer point to the second half at bit 4 at time cycle 6 912. As can be seen the searching method of FSLW circuit 800 provides an even faster search than that discussed above with respect to the FSLW circuit 600 of FIG. 6.

Returning to FIG. 8, the schematic for the FSLW circuit 800 is the same as that discussed for the FSLW circuit 800 of FIG. 1 with the exception of the masking circuit 864. The first half (bits 0 to 3) of the 8-bit input provided form the data source 808 is received as an input at a first AND gate 858. The second half (bits 4 to 7) of the 8-bit input is received as an input at a second AND gate 860 The pointer data from the pointer source 826 is received as an input at a decoder 862. The decoder 862 outputs a 4-bit signal in which the first and second bits are received as an input to a first OR gate 866. A second OR gate 868 receives the third bit as an input and the output of the first OR gate 866 as an input.

A third OR gate 870 receives the fourth bit of the decoder's output as an input and the output of the second OR gate 868 as an input. The first bit of the decoder's output and the outputs of the three OR gates 866, 868, 870 are used as a 4-bit input to the first AND gate 858 and the second AND gate 860 of the masking circuit 864. Each AND gate 858, 860 provides a 4-bit output which is used an inputs to the four OR gates 810, 812, 814, 816 of in the first level 804 of the halving circuit 802. The masking circuit 864 provides for the masking of the current pointer position and all bits prior the currently pointed to bit in the current half.

Exemplary Information Processing System

Figure 10:
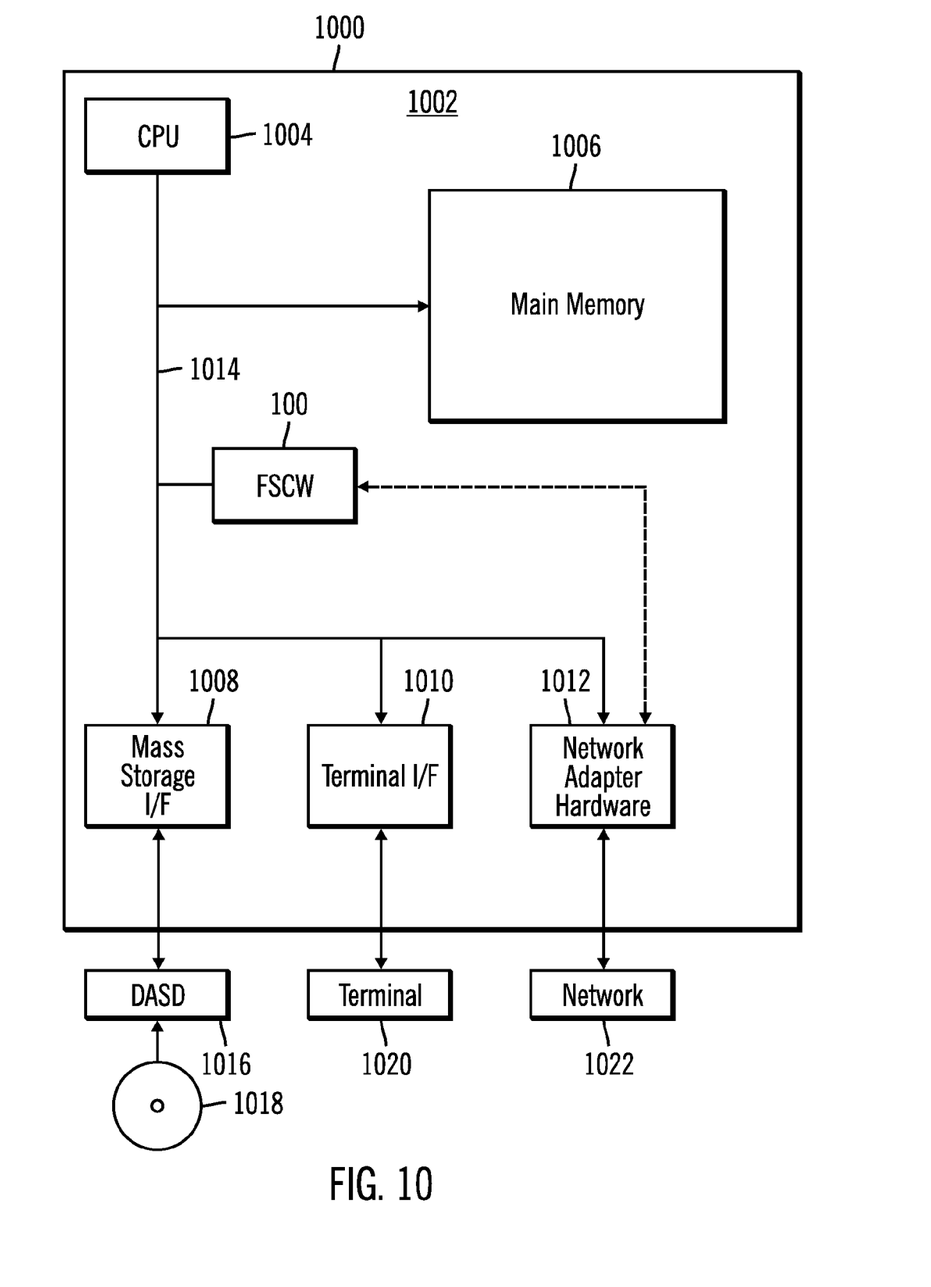
FIG. 10 is a block diagram illustrating an information processing system according to an embodiment of the present invention.

FIG. 10 is a block diagram illustrating a detailed view of an information processing system 1000. The information processing system 1000, in one embodiment, is based upon a suitably configured processing system adapted to implement the exemplary embodiment of the present invention. Any suitably configured processing system is similarly able to be used as the information processing system 1000 by embodiments of the present invention, for example, a personal computer, workstation, or the like.

The information processing system 1000 includes a computer 1002. The computer 1002 has a processor 1004 that is communicatively connected to a main memory 1006 (e.g., volatile memory), non-volatile storage interface 1008, a terminal interface 1010, a network adapter hardware 1012, and the FSLW circuit 100. A system bus 1014 interconnects these system components. The non-volatile storage interface 1008 is used to connect mass storage devices, such as data storage device 1016 to the information processing system 1000. One specific type of data storage device is a computer readable medium such as a CD drive, which may be used to store data to and read data from a CD or DVD 1018 or floppy diskette (not shown). Another type of data storage device is a data storage device configured to support, for example, NTFS type file system operations.

In one embodiment, the information processing system 1000 utilizes conventional virtual addressing mechanisms to allow programs to behave as if they have access to a large, single storage entity, referred to herein as a computer system memory, instead of access to multiple, smaller storage entities such as the main memory 1006 and data storage device 1016. Note that the term "computer system memory" is used herein to generically refer to the entire virtual memory of the information processing system 1000.

Although only one CPU 1004 is illustrated for computer 1002, computer systems with multiple CPUs can be used equally effectively. Embodiments of the present invention further incorporate interfaces that each includes separate, fully programmed microprocessors that are used to off-load processing from the CPU 1004. Terminal interface 1010 is used to directly connect one or more terminals 1020 to computer 1002 to provide a user interface to the computer 1002. These terminals 1020, which are able to be non-intelligent or fully programmable workstations, are used to allow system administrators and users to communicate with the thin client. The terminal 1020 is also able to consist of user interface and peripheral devices that are connected to computer 1002 and controlled by terminal interface hardware included in the terminal I/F 1010 that includes video adapters and interfaces for keyboards, pointing devices, and the like.

An operating system, according to an embodiment, can be included in the main memory 1006 and is a suitable multi-tasking operating system such as the Linux, UNIX, Windows XP, and Windows Server operating system. Embodiments of the present invention are able to use any other suitable operating system, or kernel, or other suitable control software. Some embodiments of the present invention utilize architectures, such as an object oriented framework mechanism, that allows instructions of the components of operating system (not shown) to be executed on any processor located within the client. The network adapter hardware 1012 is used to provide an interface to a network 1022. Embodiments of the present invention are able to be adapted to work with any data communications connections including present day analog and/or digital techniques or via a future networking mechanism. It should be noted that even though the FSLW circuit 100 is shown as a separate hardware component, it can reside in within other hardware components such as the network hardware adapter 1012.

Although the exemplary embodiments of the present invention are described in the context of a fully functional computer system, those skilled in the art will appreciate that embodiments are capable of being distributed as a program product via floppy disk, e.g. floppy disk 1018, CD ROM, or other form of recordable media, or via any type of electronic transmission mechanism.

Exemplary Process of Searching for Active Bits

Figure 11:
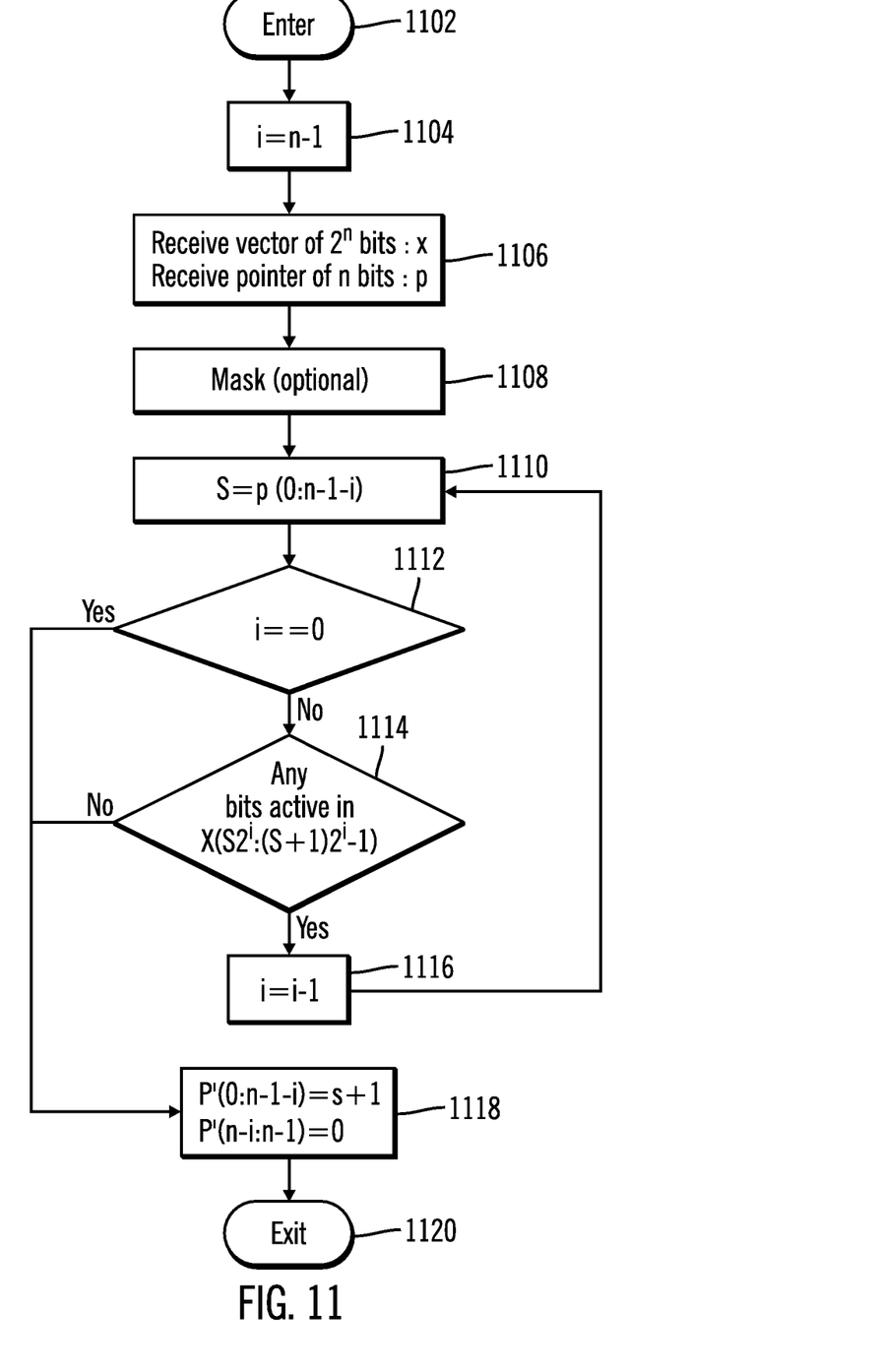
FIG. 11 is an operational flow diagram illustrating a process of searching for active bits using the FSLW 100 of FIG. 1 according to an embodiment of the present invention.

FIG. 11 is an operational flow diagram illustrating an exemplary process for searching for active bits in a vector. The operational flow diagram of FIG. 11 begins at step 1102 and flows directly to step 1104. A counter, at step 1104, is initialized to n−1. For illustrative purposes only, n is equal to 4 for the discussion of FIG. 11. Therefore, i is initially equal to 3. A vector x of $2^n$ bits and a pointer p of n bits associated with the vector x of bits, at step 1106, is received. Therefore, using the example of n=4, the vector x comprises 16 bits and the pointer p comprises 4 bits. An optional mask such as mask x(p) and mask x $(p(0)2^{n-1}: p)$, at step 1108, can be applied. Mask x(p) removes the current position in list that the pointer is at. Mask x $(p(0)2^{n-1}: p)$ masks off all entries before and including the current position in the current half. A pointer position S=p(0: n−1−i), at step 1110, is determined.

Therefore for the example of n equal to 4 and i=3, S=P(0: 0). The FSLW 100, at step 1112, determines if i==0. If the result of this determination is positive, the pointer, at step 1118 is set to p'(0: n−1−i)=S+1. As discussed above, three adders 136, 138, 140 can be used to increment the pointer to point to the correct bit. The first adder 136 increments the first MSB of the pointer and zeros out the remaining bits. The second adder 138 increments the first two MSBs of the pointer and zeros out the remaining bit. The third adder 140 increments the entire pointer. The control flow then exits at step 1120.

If the result of the determination at step 1112 is negative, the FSLW 100, at step 1114, determines if any bits are active in a current group of a mathematical power of two represented by $x(s2^i: (s+1)2^i-1)$. In the current example with n=4 and i=3, $x(s2^i: (s+1)2^i-1)=x(0:7)$ if, for example, p=0. In other words, two groups of bits have been created a first group comprising bits 0 to 7 and a second group comprising bits 8-15. So step with n=4 and i=3, step 1114 is looking at the group comprising bits 0 to 7 if, for example, p=0. FSLW 100, at step 1112, determines if i=0. If the result of this determination is positive, the control flow continues to step 1118. If the result the decision at step 1114 is negative, the control flows to step 1118 discussed above. If the result of the decision at step 1114 is positive, the counter is decremented so i=i-1 at step 1116. In the current example i=2 since i was currently at 3. The control flow returns to step 1110, where the above process is repeated for i=2.

Non-Limiting Examples

The circuit as described above is part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The method as described above is used in the fabrication of integrated circuit chips.

The resulting integrated circuit chips can be distributed by the fabricator in raw wafer form (that is, as a single wafer that has multiple unpackaged chips), as a bare chip, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard, or other input device, and a central processor.

The present invention as would be known to one of ordinary skill in the art could be produced in hardware or software, or in a combination of hardware and software. However in one embodiment the invention is implemented in software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The invention is not limited to any particular computer program or logic or language, or instruction but may be practiced with any such suitable program, logic or language, or instructions as would be known to one of ordinary skill in the art.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A computer implemented method for identifying active bits in a vector, the computer implemented method comprising:

executing on an information processing system the following:

receiving a pointer associated with a vector of bits, wherein the pointer is associated with a current bit within the vector of bits;

grouping the vector of bits into groups of a mathematical power of two, which is any non-negative integer powers of two;

determining one or more current groups which are the groups of the mathematical power of two comprising the current bit;

analyzing, in response to receiving the pointer, the one or more current groups of the power of two;

identifying, in response to the analyzing, a largest group of the power of two in the one or more current groups comprising all empty bits; and setting the pointer to point to a bit following a last bit in the identified largest group of the power of two comprising all empty bits.

2. The computer implemented method of claim 1, wherein the pointer which was received is a pointer set to the bit following the last bit in the identified largest group of the power of two comprising all empty bits.

3. The computer implemented method of claim 1, further comprising:

receiving the vector of bits from a data source.

4. The computer implemented method of claim 1, wherein the grouping further comprises:

dividing the vector of bits into at least a first group of bits and a second group of bits.

5. The computer implemented method of claim 4, wherein the analyzing further comprises:

determining a group from the first group of bits and the second group of bits that includes the current bit associated with the pointer.

6. The computer implemented method of claim 5, wherein the setting the pointer further comprises:

determining that the group comprises all empty bits; and setting, in response to the determining that the group comprises all empty bits, the pointer to a first bit in a group from the first group of bits and the second group of bits that does not include the current bit associated with the pointer.

7. The computer implemented method of claim 5, wherein the analyzing further comprises:

determining that the group comprises at least one active bit;

dividing the group into a set of subsequent power of two groups; and identifying a subsequent power of two group in the set of subsequent power of two groups including the current bit associated with the pointer.

8. The computer implemented method of claim 7, wherein the setting the pointer further comprises:

analyzing the subsequent power of two group;

determining, based on the analyzing, that a current power of two group including the current bit associated with the pointer comprises at least one active bit; and setting, in response to the determining, the pointer to a bit subsequent to the current bit associated with the pointer.

9. The computer implemented method of claim 1, further comprising:

setting the pointer to point to a bit in another group of the power of two;

masking the current bit associated with the pointer;

identifying a largest current group of the power of two that comprises all empty bits; and setting, in response to identifying the largest current group of the power of two that comprises all empty bits, the pointer to point to a next bit after a last bit in the largest current group of the power of two that comprises all empty bits.

10. The computer implemented method of claim 1, further comprising:

setting the pointer to point to a bit in another group of the power of two;

masking the current bit associated with the pointer and all bits preceding the current bit in a current half of the vector of bits;

identifying a largest current group of the power of two that comprises all empty bits; and setting, in response to the identifying the largest current group of the power of two that comprises all empty bits, the pointer to point to a next bit after a last bit in the largest current group of the power of two that comprises all empty bits.

11. A computer readable medium for identifying active bits in a vector, the computer readable medium comprising instructions for:

receiving a pointer associated with a vector of bits, wherein the pointer is associated with a current bit within the vector of bits;

grouping the vector of bits into groups of a mathematical power of two, which is any non-negative integer powers of two;

determining one or more current groups which are the groups of the mathematical power of two comprising the current bit;

analyzing, in response to receiving the pointer, the one or more current groups of the power of two;

identifying, in response to the analyzing, a largest group of the power of two in the one or more current groups comprising all empty bits; and setting the pointer to point to a bit following a last bit in the identified largest group of the power of two comprising all empty bits.

12. The computer readable medium of claim 11, wherein the instructions for the grouping further comprise instructions for:

dividing the vector of bits into at least a first group of bits and a second group of bits.

13. The computer readable medium of claim 11, further comprising instructions for:

setting the pointer to point to a bit in another group of the power of two;

masking the current bit associated with the pointer;

identifying a largest current group of the power of two that comprises all empty bits; and setting, in response to identifying the largest current group of the power of two that comprises all empty bits, the pointer to point to a next bit after a last bit in the largest current group of the power of two that comprises all empty bits.

14. The computer readable medium of claim 11, further comprising instructions for:

setting the pointer to point to a bit in another group of the power of two;

masking the current bit associated with the pointer and all bits preceding the current bit in a current half of the vector of bits;

identifying a largest current group of the power of two that comprises all empty bits; and setting, in response to the identifying the largest current group of the power of two that comprises all empty bits, the pointer to point to a next bit after a last bit in the largest current group of the power of two that comprises all empty bits.

15. An information processing system for identifying active bits in a vector, the information processing system comprising:

a memory;

a processor communicatively coupled to the memory; and a circuit communicatively coupled to the memory and the processor, wherein the circuit is adapted to:

receive a pointer associated with a vector of bits, wherein the pointer is associated with a current bit within the vector of bits;

group the vector of bits into groups of a mathematical power of two, which is any non-negative integer powers of two;

determine one or more current groups which are the groups of the mathematical power of two comprising the current bit;

analyze, in response to receiving the pointer, the one or more current groups of the power of two;

identify, in response to the analyzing, a largest group of the power of two in the one or more current groups comprising all empty bits; and setting the pointer to point to a bit following a last bit in the identified largest group of the power of two comprising all empty bits.

16. The information processing system of claim 15, wherein the circuit is further adapted to:

analyze the vector of bits in groups of mathematical powers of two; and identify at least one active bit within the vector of bits based on the vector of bits being analyzed in groups of mathematical powers of two.

17. The information processing system of claim 16, wherein the circuit is further adapted to group by:

dividing the vector of bits into at least a first group of bits and a second group of bits.

18. The information processing system of claim 15, wherein the pointer which was received is a pointer set to the bit following the last bit in the identified largest group of the power of two comprising all empty bits.

19. The information processing system of claim 15 wherein the circuit is further adapted to:
   set, the pointer to point to a bit in another group of the power of two;
   mask, the current bit associated with the pointer;
   identify, a largest current group of the power of two that comprises all empty bits; and
   set, in response to identifying the largest current group of the power of two that comprises all empty bits, the pointer to point to a next bit after a last bit in the largest current group of the power of two that comprises all empty bits.

20. The information processing system of claim 15, wherein the circuit is further adapted to:
   set the pointer to point to a bit in another group of the power of two;
   mask the current bit associated with the pointer and all bits preceding the current bit in a current half of the vector of bits;
   identify, a largest current group of the power of two that comprises all empty bits; and
   set, in response to the identifying the largest current group of the power of two that comprises all empty bits, the pointer to point to a next bit after a last bit in the largest current group of the power of two that comprises all empty bits.

* * * * *